3,513,097
FUNCTIONAL FLUID COMPOSITIONS
Frank H. Langenfeld, St. Louis, Mo., assignor to Monsanto Company, St. Louis, Mo., a corporation of Delaware
No Drawing. Continuation-in-part of application Ser. No. 516,077, Dec. 23, 1965. This application Nov. 13, 1967, Ser. No. 682,546
Int. Cl. C09k 3/00
U.S. Cl. 252—78                                             6 Claims

ABSTRACT OF THE DISCLOSURE
Compositions of the class which exhibit the ability to inhibit and control damage to mechanical members in contact with said compositions by the incorporation of water into a class of base stocks representative of which are esters and amide of phosphorus, o-silicates, polysilicones, arylethers and esters. The compositions have many uses, among which are their use as hydraulic fluids.

---

This application is a continuation-in-part of application Ser. No. 516,077, filed Dec. 23, 1965, now abandoned.

This invention relates to functional fluid compositions having an ability to inhibit and control damage to mechanical members in contact with said fluid compositions, to functional fluid compositions which exhibit an improved tendency to resist fluid degradation and more particularly to compositions comprising certain functional fluids and an additive amount, sufficient to inhibit and control damage, of water.

Many different types of materials are utilized as functional fluids and functional fluids are used in many different types of applications. Thus, such fluids have been used as electronic coolants, diffusion pump fluids, lubricants, damping fluid, bases for greases, power transmission and hydraulic fluids, heat transfer fluids, heat pump fluids, refrigeration equipment fluids and as filter mediums for air conditioning systems. In many of these uses there have been reports of damage to the fluid during use and to mechanical members, especially metallic members, in contact with the fluid as evidenced by a loss of weight of such members. Thus, damage has been reported in aircraft hydraulic systems, jet turbine control systems, and steam turbine control systems. Damage has also been observed on such materials as glass, Teflon, Mylar, Plexiglas and other members constructed from materials other than metals.

One particularly undesirable condition which exists during the use of a functional fluid and which can cause damage is cavitation, which can be described as a phenomenon which results in the formation and subsequent violent collapse of vapor-filled bubbles in a fluid subjected to requisite pressure changes. Bubbles can be formed when the fluid pressure is at or below its bubble point pressure and when fluid temperature peaks above fluid bubble point temperature; above the bubble point pressure, the bubbles collapse. Pressure changes sufficient to cause cavitation can occur in several ways; for example, a fluid flowing through a restriction, such as a partially closed valve, can encounter at the point of highest velocity a pressure far lower than both the bubble point and the valve outlet pressures thus resulting in bubble formation. As these bubbles reach a point of high pressure, for example on the discharge side of the valve, a violent collapse of the bubbles occurs thereby producing shock waves which can be severe enough to damage the fluid and mechanical members in contact with the fluid. As another example, cavitation conditions can occur when a surface is moved through or vibrated in a relatively stagnant liquid.

While there are many undesirable results caused by damage, one important aspect of the problem of damage is the effect on hydraulic systems and fluids experiencing such damage. For example, the structural mechanical parts in a hydraulic system, such as pumps and valves, exhibit a marked decrease in strength, and the geometry of the parts is altered. Such changes in the case of pumps can cause a decrease in pumping efficiency and in the case of valves can cause faulty operations, excessive leakage or even hazardous conditions. As a result, damage necessitates premature overhaul of mechanical parts which is both costly and time consuming. In addition, as damage occurs the metal from metallic mechanical parts in contact with the functional fluid contaminates the fluids requiring premature draining of the fluids from the system, filter clogging and excessive filter replacement, and can cause a change in physical and chemical properties of the fluids. Also, metal contaminants can reduce the oxidative stability of a fluid thereby adversely affecting fluid performance. In addition to any effects resulting from contamination by metal (or other) contaminant, such damage to the fluid can manifest itself in numerous ways, among which are (a) viscosity change, (b) increase in acid number, (c) formation of insoluble materials, (d) increased chemical reactivity and (e) discoloration.

It is, therefore, an object of this invention to provide functional fluid compositions having an ability to inhibit and control damage.

Further objects will be apparent from the following description of the invention.

It has now been found that damage, herein defined to include damage to a functional fluid and to mechanical members in contact with said fluid, can be effectively controlled and inhibited in the many functional fluid systems described by the incorporation of damage inhibiting amounts of water into a functional fluid. It is an important part of this invention that the incorporation of water in functional fluids produces a functional fluid composition having the ability to inhibit damage without completely affecting adversely other essential properties of such fluids such as viscosity, oxidative and thermal stability, corrosion resistance in the presence of metal parts and lubricating qualities of the functional fluid.

The concentration of water in a functional fluid is adjusted in terms of the particular system and the functional fluid which is utilized in this system to provide functional fluid compositions of this invention which contain an additive amount of water sufficient to inhibit and control damage. Thus, for the functional fluid compositions of this invention prepared from esters of an acid of phosphorus, the concentration of water in the composition can vary from 0.30 volume percent to about 5 volume percent, whereas for the remaining base stocks the concentration of water can vary from 0.20 volume percent to about 5 volume percent, the particular concentration being that amount which will effectively inhibit and control damage. The preferred additive concentration range in the functional fluid compositions of this invention is from 0.35 volume percent to about 2 volume percent of water, and even more preferably from 0.40 volume percent to about 1.5 volume percent of water. Therefore, included within the present invention are compositions comprising a functional fluid and a damage inhibiting amount of water, that is, water is added, in a concentration sufficient to control and inhibit damage. The compositions of this invention are prepared by incorporating a damage inhibiting amount of water into the functional fluid. Thus, the process for preparing a functional fluid having the ability to inhibit and control damage to mechanical members in contact with the functional fluid is accomplished by adding water to a functional fluid to obtain a concentration of water in the functional fluid of from 0.30 volume percent to about 5 volume percent. In carrying out the process, water is added to the composition with sufficient agitation to incorporate additive amounts of water.

The functional fluids, to which water is added to provide the functional fluid compositions of this invention, include functional fluids comprising a major amount of a base stock, representative base stocks of which are esters of an acid of phosphorus, amides of an acid of phosphorus, hydrocarbyl silicates, silicones, aromatic ether compounds, which term includes polyphenyl ether compounds, polyphenyl thioether compounds, mixed polyphenyl etherthioether compounds, phenoxybiphenyl compounds, phenylmercaptobiphenyl compounds, mixed phenoxyphenylmercaptobiphenyl compounds and the above ether compounds in which part or all of the phenyl and phenylene rings are replaced with a heterocyclic group such as thiophene or pyridene, mono- and dialkylthiophenes, chlorinated biphenyl, monoesters, di- and tricarboxylic acid esters, esters of polyhydric compounds, complex esters and mixtures thereof, blends of esters of an acid of phosphorus and/or amides of an acid of phosphorus and/or aromatic ether compounds and/or esters of polyhydric compounds with halogenated blending agents, representative of which are halodiphenyl ethers, halobenzenes, halonaphthalenes, haloalkylated benzenes, perhalodienes and perhalocyclicdienes.

Whereas the above base stocks can be utilized to prepare functional fluid compositions of this invention when utilized in major amounts, it is preferred to use such base stocks at a concentration of at least about 60 weight percent and even more preferably at concentrations of 65, 75, 85 and 95 weight percent or the above concentrations at a corresponding volume percent.

In general, when a base stock that is utilized to prepare a functional fluid composition of this invention is to be utilized in, for example, hydraulic systems which require the utmost of purity, such as certain types of high-response aircraft hydraulic systems, it is preferred to have a base stock which has an acid number of 0.50 or less, even more preferably 0.35 or less and still more preferably 0.15 or less. "Acid number" is herein defined as the number of milligrams of potassium hydroxide required to neutralize one gram of sample. Thus, for example, when esters of an acid of phosphorus or amides of an acid of phosphorus are utilized as a base stock to prepare functional fluid compositions of this invention, it is preferred that such base stocks have acid numbers within the limits as set forth above when such base stocks are to be utilized in high-response aircraft hydraulic systems. Thus, the compositions of this invention when incorporated initially in aircraft hydraulic systems should be within the acid number limits as set forth above.

The following base stocks are only illustrative of typical base stocks that can be utilized in preparing the functional fluid compositions of this invention and the instant invention can be practiced utilizing various modifications of the base stocks whch are set forth below.

Typical examples of esters of an acid of phosphorus and amides of an acid of phosphorus which are suitable as base stocks for preparing the functional fluid compositions of this invention are those represented by the structure

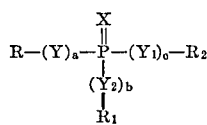

wherein Y is selected from the group consisting of oxygen, sulfur, and

$Y_1$ is selected from the group consisting of oxygen, sulfur and

and $Y_2$ is selected from the group consisting of oxygen, sulfur and $$\begin{array}{c} R_5 \\ | \\ -N- \end{array}$$

R, $R_1$, $R_2$, $R_3$, $R_4$ and $R_5$ are each independently selected from the group consisting of alkyl, alkoxyalkyl, aralkyl, aroxyalkyl, aroxyaryl, alkoxyaryl and the members of the above group further substituted with halogen and/or alkyl, X is selected from the group consisting of sulfur and oxygen and $a$, $b$ and $c$ are whole numbers having a value of 0 to 1 and the sum of $a+b+c$ is from 1 to 3. These compounds within the generic formula can be prepared by the prior art methods for preparing esters of phosphorus and amides of phosphorus.

Typical examples of alkyl radicals are as follows: methyl, ethyl, n-propyl, isopropyl, n-butyl, isobutyl, sec-butyl, tert-butyl, n-amyl, isoamyl, 2-methylbutyl, 2,2-dimethyl propyl, 1-methyl butyl, diethyl methyl, 1,2-dimethyl propyl, tert-amyl, n-hexyl, 1-methylamyl, 1-ethyl butyl, 1,2,2-trimethyl propyl, 3,3-dimethyl butyl, 1,1,2-trimethyl propyl, 2-methyl amyl, 1,1-dimethyl butyl, 1-ethyl 2-methyl propyl, 1,3-dimethyl butyl, isohexyl, 3-methylamyl, 1,2-dimethyl butyl, 1-methyl 1-ethyl propyl, 2-ethyl butyl, n-heptyl, 1,1,2,3-tetramethyl propyl, 1,2-dimethyl 1-ethyl propyl, 1,1,2-trimethyl butyl, 1-isopropyl 2-methyl propyl, 1-methyl 2-ethyl butyl, 1,1-diethyl propyl, 2-methyl hexyl, 1,1-dimethyl amyl, 1-isopropyl butyl, 1-ethyl 3-methyl buty l, 1,4-dimethyl amyl, isoheptyl, 1-methyl 1-ethyl butyl, 1-ethyl 2-methyl butyl, 1-methyl hexyl, 1-propyl butyl, n-octyl, 1-methyl heptyl, 1,1-diethyl 2-methyl propyl, 1,1,3,3-tetramethyl butyl, 1,1-diethyl butyl, 1,1-dimethyl hexyl, 1-methyl 1-ethyl amyl, 1-methyl 1-propyl butyl, 2-ethyl hexyl, 6-methyl heptyl (iso-octyl), n-nonyl, 1-methyl octyl, 1-ethyl heptyl, 1,1-dimethyl heptyl, 1-ethyl 1-propyl butyl, 1,1-diethyl 3-methyl butyl, diisobutyl methyl, 3,5,5-trimethyl hexyl, 3,5-dimethyl heptyl, n-decyl, 1-propyl heptyl, 1,1-diethyl hexyl, 1,1-dipropyl butyl, 2-isopropyl 5-methyl hexyl, decyl radicals, e.g. n-decyl, dodecyl radicals, e.g. lauryl, tetradecyl radicals, e.g. myristyl, hexadecyl radicals, e.g. cetyl; and octadecyl. Typical examples of aralkyl radicals, aryl for the purpose of any aryl-containing radical is herein defined to include mono-, di- and polynuclear hydrocarbons, such as phenyl, naphthyl and anthryl, e.g. aryl and alkylaryl-substituted alkyl radicals, are benzyl methylbenzyl, caprylbenzyl, diisobutylbenzyl, phenylethyl, phenylpropyl, phenyloctadecyl; xenyl- and alkylxenyl-substituted alkyl radicals, e.g. xenylmethyl, caprylxenylmethyl, xenylethyl, diisobutylxenylmethyl; naphthyl- and alkylnaphthyl-substituted alkyl radicals, e.g. naphthylmethyl, tert-amylnaphthylmethyl, naphthylethyl and octylnaphthylethyl. Typical examples of oxygen-containing alkyl radicals, e.g. alkoxy-substituted alkyl radicals, are propoxyethyl radicals, e.g. n-propoxyethyl, isopropoxyethyl; butoxyethyl radicals, e.g. n-butoxyethyl, isobutoxyethyl, tert-butoxyethyl; octoxyethyl radicals, e.g. n-octoxyethyl, diisobutoxyethyl; dibutoxypropyl radicals, e.g. 2,3-di-n-butoxypropyl, 3,3-diisobutoxypropyl; dioctoxypropyl and 2,3-bis(diisobutoxy)propyl. Typical examples of aroxy-substituted alkyl radicals are, for example, phenoxy- and alkylphenoxy-substituted alkyl radicals, e.g. phenoxymethyl, phenoxyethyl, cetylphenoxyethyl, and caprylphenoxyethyl. Typical examples of aryl, alkoxyaryl, aroxyaryl and halo and alkyl derivatives thereof are phenyl, cresyl, xylyl, mesityl, ethylphenyl, diethylphenyl, isopropylphenyl, n-propylphenyl, tert-butylphenyl, di-tert-butylphenyl, isobutylphenyl, n-butylphenyl, tert-amylphenyl, cyclohexylphenyl, methylcyclophenyl, caprylphenyl, diisobutylphenyl, laurylphenyl, cetylphenyl, paraffin wax-substituted phenyl, monochlorophenyl, polychlorophenyl, e.g. dichlorophenyl, trichlorophenyl, lauroxyphenyl, xenyl, mono- and polychloroxenyl, caprylxenyl, phenoxyphenyl, thiophenoxyphenyl, diisobutylphenoxyphenyl, naphthyl, mono- and polychloronaphthyl, cetylnaphthyl, methylmonochlorophenyl radicals, methylpolychlorophenyl radicals, e.g. methyldichlorophenyl radicals and methyltrichlorophenyl radicals.

It is contemplated within the scope of this invention that the aforedescribed radicals such as alkyl, aralkyl, alkoxyalkyl aroxyalkyl, aryl, aroxyaryl, alkoxyaryl and alkaryl can have all or part of the hydrogen replaced with halogen, such as fluorine, chlorine or bromine.

The preferred esters of an acid of phosphorus are those base stocks wherein $a$, $b$ and $c$ have a value of 1, $Y$, $Y_1$ and $Y_2$ are oxygen and R, $R_1$ and $R_2$ are alkyl, aryl or substituted aryl. These preferred base stocks are hereinafter referred to generically as phosphates and include trialkyl phosphates, triaryl and/or substituted aryl phosphates and mixed aryl and/or substituted-arylalkyl phosphates. The substituents attached to the aryl radical include by way of example halogen, alkyl, haloalkyl and aroxy. Preferred substituents on the aryl group are halo and alkyl and with respect to the halo atom it is preferred that such halo atom be chloro and/or bromo and occupy the meta position. In addition, the above three groups of phosphate base stocks can be defined by the number of carbon atoms present in the alkyl group and the aryl and substituted-aryl group, respectively, and with respect to the alkyl groups, it is preferred to have from about 2 to about 18 carbon atoms, more preferably from about 2 to about 12 carbon atoms and with respect to the number of carbon atoms present in the aryl and substituted aryl groups, it is preferred to have from about 6 to about 16 carbon atoms and more preferably from about 6 to 12 carbon atoms. Examples of the above three groups of phosphates are those phosphates represented by the generic formula as set forth above utilizing alkyl, alkaryl, haloaryl, haloalkaryl and aroxyaryl radicals as illustrated above. Additional typical examples of phosphates are di-butylphenyl phosphate, triphenyl phosphate, tricresyl phosphate, tributyl phosphate, tri-2-ethylhexyl phosphate, trioctyl phosphate and mixtures of the above phosphates, such as mixtures of tributyl phosphate and tricresyl phosphate and mixtures of isooctyldiphenyl phosphate and 2-ethylhexyldiphenyl phosphate and mixtures of trialkyl phosphates and tricresyl phosphates and the like.

The preferred amides of an acid of phosphorus are those compounds wherein $a$, $b$ and $c$ have a value of 1, $Y$ and $Y_1$ are selected from oxygen and

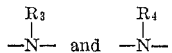

respectively and $Y_2$ is

These base stocks are referred to generically as amides of phosphorus and include phosphoroamidates, phosphorodiamidates and phosphorotriamidates. The preferred class of mono-, di- and tri-phosphoroamidates are the diaryl- and/or substituted-aryl-N,N-dialkylphosphoroamidates, aryl- and/or substituted-aryl-N,N-dialkyl-N',N'-dialkylphosphorodiamidates and the N,N-dialkyl-N',N'-dialkyl-N'',N''-dialkylphosphorotriamidates. The substituents attached to the aryl radical include by way of example halogen, alkyl, haloalkyl and aroxy. The preferred substituents on the aryl group are halogen, alkyl and haloalkyl and with respect to the halogen atom, it is preferred that such halogen atom be chloro or bromo and occupy the meta position. In addition, the mono-, di- and triphosphoroamidates can be defined by the number of carbon atoms present in the alkyl group, the aryl group and the substituted aryl group, respectively, and with respect to the alkyl group, it is preferred to have from about 1 to about 18 carbon atoms, more preferably from about 1 to about 8 carbon atoms and with respect to the number of carbon atoms present in the aryl and substituted-aryl group, it is preferred to have from 6 to about 16 carbon atoms, more preferably from 6 to about 12 carbon atoms. Examples of the mono-, di- and triphosphoroamidates are those compounds represented by the generic formula as set forth above utilizing alkyl, alkaryl, haloaryl, haloalkaryl and aroxy-aryl radicals as illustrated above. Typical examples of the amides of an acid of phosphorus, that is, mono-, di- and triamides of an acid of phosphorus, are phenyl-methyl-N,N-dimethylphosphoroamidate, phenyl-methyl-N,N-di-n-butylphosphoroamidate, mixtures of phenyl-m-cresyl-N,N-dimethylphosphoroamidate and phenyl-p-cresyl-N,N-dimethylphosphoroamidate, mixtures of m-cresyl-p-cresyl-N,N-dimethylphosphoroamidate,
di-m-cresyl-N,N-dimethylphosphoroamidate,
di-p-cresyl-N,N-dimethylphosphoroamidate,
di-m-bromophenyl-N-methyl-N-n-butylphosphoroamidate,
di-m-chlorophenyl-N-methyl-N-n-butylphosphoroamidate,
di-alpha,alpha,alpha-trifluoro-m-cresyl-N-methyl-N-n-butylphosphoroamidate,
di-p-bromophenyl-N-methyl-N-n-isoamylphosphoramidate,
di-p-chlorophenyl-N-methyl-N-n-isoamylphosphphosphoroamidate,
p-chlorophenyl-m-bromophenyl-N-methyl-N-n-isoamylphosphoroamidate,
phenyl-N-methyl-N-butyl-N'-methyl-N'-butylphosphorodiamidate,
phenyl-N,N-di-n-butyl-N',N'-di-n-butylphosphorodiamidate,
phenyl-N,N-dimethyl-N',N'-dimethylphosphorodiamidate,
m-chlorophenyl-N-methyl-N-n-butyl-N'-methyl-N'-n-butylphosphorodiamidate,
m-bromophenyl-N-methyl-N-n-butyl-N'-methyl-N'-n-butyl-N'-methyl-N'-n-butylphosphorodiamidate,
p-chlorophenyl-N-methyl-N-isobutyl-N'-methyl-N'-isoamylphosphorodiamidate,
p-bromophenyl-N-methyl-N-isobutyl-N'-methyl-N'-isoamylphosphorodiamidate,
N-methyl-N-butyl-N'-methyl-N'-butyl-N''-methyl-N''-butylphosphorotriamidate,
N-methyl-N-butyl-N',N''-tetramethylphosphorotriamidate,
N-di-n-propyl-N',N''-tetramethylphosphorotriamidate and
N,N'-di-n-propyl-N''-dimethylphosphorotriamidate.

Typical examples of phosphinate esters are phenyl-di-n-propyl phosphinate,
phenyl-di-n-butyl phosphinate,
phenyl-di-sec-butyl phosphinate,
phenyl-di-n-pentyl phosphinate,
phenyl-di-neopentyl phosphinate,
phenyl-di-n-hexyl phosphinate,
phenyl-di-n-butyl thiophosphinate.
p-methoxyphenyl-di-n-butyl phosphinate,
m-chlorophenyl-di-n-butyl phosphinate,
phenyl-(n-propyl-n-pentyl) phosphinate,
phenyl-(n-propyl-n-butyl) phosphinate,
phenyl-(n-propyl-n-hexyl) phosphinate,
phenyl-(n-butyl-pentyl) phosphinate,
phenyl-(n-butyl-n-hexyl) phosphinate,
phenyl-(n-pentyl-n-hexyl) phosphinate,
phenyl-(neopentyl-n-propyl) phosphinate,
phenyl-(neonpentyl-n-butyl) phosphinate,
phenyl-(neopentyl-n-hexyl) phosphinate,
thiophenyl-di-n-propyl phosphinate,
thiophenyl-di-n-pentyl phosphinate,
cresyl-di-n-pentyl phosphinate.
tert-butylphenyl-di-n-butyl phosphinate, n-butylphenyl-di-n-butyl phosphinate,
sec-butylphenyl-di-n-butyl phosphinate,
ethylphenyl-di-n-butyl phosphinate,
xylyl-di-n-butyl phosphinate,
thiophenyl-di-n-hexyl phosphinate,
thiophenyl-di-n-butyl phosphinate,
thiophenyl-di-n-propyl thiophosphinate,
thiophenyl-di-n-butyl thiophosphinate,
thiophenyl-di-n-pentyl thiophosphinate,
thiophenyl-di-n-hexyl thiophosphinate,
thiophenyl-(n-propyl-n-butyl) phosphinate,
thiophenyl-(propyl-N-pentyl) phosphinate ,
thiophenyl-(n-propyl-n-hexyl) phosphinate,
thiophenyl-(n-butyl-n-pentyl) phosphinate,
thiophenyl-(n-butyl-n-hexyl) phosphinate,
thiophenyl-(n-pentyl-n-hexyl) phosphinate,
thiophenyl-(n-propyl-n-butyl) thiophosphinate,
thiophenyl-(n-propyl-n-pentyl) thiophosphinate,
thiophenyl-(n-propyl-n-hexyl) thiophosphinate,
thiophenyl-(n-butyl-n-pentyl) thiophosphinate,
thiophenyl-(n-butyl-n-hexyl) thiophosphinate and
thiophenyl-(n-pentyl-n-hexyl) thiophosphinate.

Typical examples of orthosilicates and alkoxy polysiloxanes which can be utilized as base stocks for preparing compositions of this invention are those base stocks represented by the structural formula

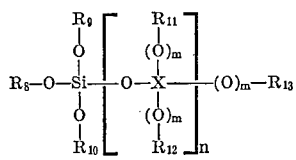

wherein $R_8$, $R_9$ and $R_{10}$ are each independently selected from alkyl, alkoxyalkyl, aryl, alkaryl and members of the above group further substituted with halogen, O is oxygen, Si is silicon, X is a member of the group consisting of carbon and silicon, $m$ is a whole number having a value of 0 or 1, $n$ is an integer having a value of from 1 to about 200 or more and when X is carbon $m$ is 0, $n$ is 1 and $R_{11}$, $R_{12}$ and $R_{13}$ are each selected from hydrogen and a member of the group representing $R_8$ and when X is silicon $m$ is 1, $n$ is an integer having a value of from 1 to about 200 or more. It is preferred that the percentage of radicals based upon the sum of all of the radicals represented by $R_8$, $R_9$, $R_{10}$, $R_{11}$, $R_{12}$ and $R_{13}$ which are hydrogen be less than 10 percent and even more preferably less than 2 percent.

Typical examples of alkyl, alkoxyalkyl, aryl, alkaryl and members of this group further substituted with halogen are illustrated above.

Typical examples of orthosilicates useful as base stocks include the tetraalkyl orthosilicates such as tetra(octyl)-orthosilicates, tetra(2-ethylhexyl)orthosilicates and the tetra(isooctyl)orthosilicates and those in which the isooctyl radicals are obtained from isooctyl alcohol which is derived from the oxo process, and the (trialkoxysilico) trialkyl orthosilicates, otherwise referred to as hexa (alkoxy) disiloxanes, such as hexa(2-ethylbutoxy) disiloxane and hexa(2-ethylhexoxy) disiloxane.

The preferred tetraalkyl orthosilicates and hexa(alkoxy) disiloxanes are those in which the alkyl or alkoxy radicals have from 4 to 12 carbon atoms and in which the total number of carbon atoms in the orthosilicate is from 16 to 60.

In addition to the hexa(alkoxy) disiloxanes referred to above, other preferred hexa(alkoxy) disiloxanes are those in which the alkyl radical of the alkoxy groups are selected from 1-ethylpropyl, 1,3-dimethylbutyl, 2-methylpentyl, 1-methylhexyl, 1-ethylpentyl, 2-butylhexyl and 1-methyl-4-ethyloctyl.

Typical examples of the siloxanes or silicones which are useful as base stocks are those base stocks represented by the structural formula

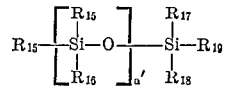

wherein $R_{14}$, $R_{15}$, $R_{16}$, $R_{17}$, $R_{18}$, and $R_{19}$ are each independently selected from hydroxyl, alkyl, alkoxyalkyl, aralkyl, aryl, alkaryl and members of the above group further substituted with halogen and $n'$ is a whole number from about 0 to about 200 or more. Typical examples of alkyl, alkoxyalkyl, aralkyl, aryl, alkaryl and members of this group further substituted with halogen are illustrated above. With respect to the radicals defined above, it is preferred that the radicals be selected from alkyl and haloalkyl having from 1 to 4 carbon atoms and aryl, alkaryl, haloaryl and haloalkaryl having from 6 to 10 carbon atoms. In addition it is preferred that the percentage of radicals based upon the sum of all of the radicals represented by $R_{14}$, $R_{15}$, $R_{16}$, $R_{17}$, $R_{18}$ and $R_{19}$ which are hydroxyl be less than 5% and even more preferably less than 2%. Typical examples of the siloxanes are poly(methyl) siloxane, poly(methyl, phenyl) siloxane, poly(methyl, chlorophenyl) silaxane and poly(methyl, 3,3,3-trifluoropropyl) siloxane.

Typical examples of di- and tricarboxylic acid esters which are suitable as base stocks are those base stocks represented by the structure

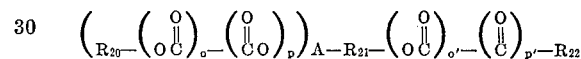

wherein $o$, $o'$, $p$ and $p'$ each whole numbers having the value of 0 to 1 provided that the sum of each of $o+p$ and $o'+p'$ is 1; A is a whole number having a value of 1 to 2; $R_{20}$ and $R_{22}$ are each independently selected from alkyl, alkoxyalkyl, cycloalkyl, alkyl cycloalkyl, aralkyl, alkaryl and members of the above group further substituted by haogen and $R_{21}$ is selected from alkylene, alkenylene, phenylene and members of the above group further substituted by carboxy, carboalkoxy or acyloxy. Typical examples of alkyl, alkoxyalkyl, aralkyl, aryl, alkaryl and halo derivatives thereof are those radicals illustrated above. Typical examples of alkylene and alkenylene are methylene, ethylene, propylene, tetramethylene, pentamethylene, octamethylene, decamethylene, 2-propenylene and alkenylene and alkylene radicals having from 1 to 16 carbon atoms. Typical examples of cycloalkyl and alkyl cycloalkyl radicals are cyclopentyl, alkylated cyclopentyl, cyclohexyl and alkylated cyclohexyl radicals, e.g., mono- and polymethylcyclopentyl radicals, mono- and polymethylcyclohexyl radicals, mono- and polyethylcyclohexyl radicals, mono- and polyisopropylcyclohexyl radicals, mono- and poly-tert-amylcyclohexyl radicals, n-octylcyclohexyl radicals, diisobutylcyclohexyl (i.e., "tert-octyl"-cyclohexyl) radicals, nonylcyclohexyl radicals, diisoamylcyclohexyl radicals, laurylcyclohexyl radicals and cetylcyclohexyl radicals. Typical examples of acyloxy,

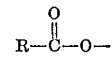

and carboalkoxy,

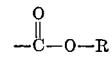

are those radicals wherein R in the acyloxy and carboalkoxy radicals is alkyl having from 1 to 18 carbon atoms. Examples of these alkyl groups are illustrated above. With respect to the di- and tricarboxylic acids, it is preferred that $R_{20}$ and $R_{22}$ be alkyl having from about 2 to about 18 carbon atoms, more preferably from about 4 to about 14 carbon atoms and $R_{21}$ be alkylene having from about 2 to about 12 carbon atoms, more preferably from about 4 to about 10 carbon atoms.

Typical examples of di- and tricarboxylic acid esters are di(2-ethylhexyl) azelate, di(2-ethylhexyl) sebacate, diisooctyl sebacate, 2-ethylhexyl 3:5:5 trimethylhexyl sebacate, diisooctyl azelate, di(3:5:5 trimethylhexyl) sebacate, di(1-methyl-4-ethyloctyl) sebacate, diisodecyl azelate, diisotridecyl azelate, di(1-methyl-4-ethyloctyl) glutarate, di(2-ethylhexyl) adipate, di(3-methylbutyl) azelate, di(3:5:5 trimethylhexyl) azelate, di(2-ethylhexyl) adipate, di($C_{10}$ oxo) adipate, bis(diethylene glycol monobutyl ether) adipate, di(isooctyl/isodecyl) adipate, diisotridecyl adipate, triethylene glycol di(2-ethylhexanoate), hexanediol 1,6-di(2-ethylhexanoate) and dipropylene glycol dipelargonate. Additional examples are mixtures of esters made from an aliphatic dibasic acid and a technical mixture of alcohols such as a mixture of alcohols obtained by the oxo process.

Typical examples of polyesters which are suitable as base stocks are those base stocks represented by the structure

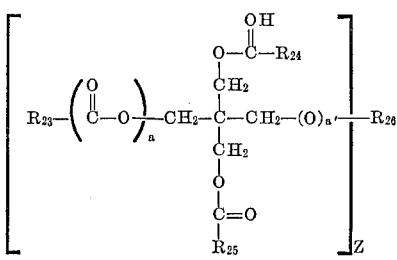

wherein $R_{23}$ is selected from the group consisting of hydrogen and alkyl, $R_{24}$ and $R_{25}$ are each selected from the group consisting of alkyl, alkoxyalkyl, cycloalkyl, alkyl cycloalkyl, aralkyl, aryl, alkylaryl and members of the above group further substituted with halogen, $a$ is a whole number having a value of 0 to 1, $a'$ is a whole number having a value of 0 to 1, Z is a whole number having a value of 1 to 4 and when Z is 1 $a'$ is 0 and $R_{26}$ is acyloxy and when Z is 2 to 4 $a'$ is 1 and $R_{26}$ is acyl. Typical examples of alkyl, alkoxyalkyl, aralkyl, cycloalkyl, alkyl cycloalkyl, aryl, alkaryl, members of the above group further substituted with halogen, and acyloxy are those illustrated above. With respect to the above polyesters, it is preferred that $R_{23}$, $R_{24}$ and $R_{25}$ be alkyl having from about 2 to about 18 carbon atoms, more preferably from about 4 to about 10 carbon atoms and $R_{26}$ be acyloxy or acyl having from about 3 to about 12 carbon atoms, more preferably from about 4 to about 10 carbon atoms.

Typical examples of polyester compounds can be prepared by the reaction of an acid compound with a polyhydroxy compound which polyhydroxy compound can be trimethylolpropane, trimethylolethane, pentaerythritol, dipentaerythritol, tripentaerythritol and tetrapentaerythritol.

The acids which may be utilized are, for example, aliphatic monocarboxylic acids, alicyclic monocarboxylic acids, aromatic monocarboxylic acids and heterocyclic monocarboxylic acids, such as propionic, butyric, isobutyric, n - valeric, caproic, n - heptylic, caprilic, 2 - ethylhexanoic, 2,2 - dimethylheptanoic and pelargonic. Typical examples of esters of this type are trimethylolpropane, tri-n-pelargonate, trimethylolpropane tricaprate, trimethylolpropane tricaprylate, the trimethylolpropane triester of mixed octanoates, pentaerythrityl tetrabutyrate, pentaerythrityl tetravalerate, pentaerythrityl tetracaproate, pentaerythrityl dibutyrate dicarproate, pentaerythrityl butyrate caproate divalerate, pentaerythrityl butyrate trivalerate, pentaerythrityl butyrate tricaproate, pentaerythrityl tributyrate caproate. Suitable dipentaerythrityl esters include dipentaerythrityl hexavalerate, dipentaerythrityl hexacaproate, dipentaerythrityl hexaheptoate, dipentaerythrityl hexacaprylate, dipentaerythrityl tributyrate tricaproate, dipentaerythrityl trivalerate trinonylate, dipentaerythrityl mixed hexaesters of $C_{4-10}$ fatty acids.

Other examples of esters which are also suitable as base stocks are hydrocarbon monoesters containing one ester group, typical examples of which are isooctyl stearate and 2-ethylhexyl octoate.

Typical complex esters which are suitable as base stocks are represented by the structure

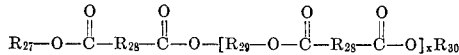

wherein $R_{27}$ and $R_{30}$ are each selected from the group consisting of hydrogen, alkyl, alkoxyalkyl, aralkyl, aryl, alkylaryl, cycloalkyl, alkyl cycloalkyl, $R_{28}$ and $R_{29}$ are each selected from the group consisting of alkylene, alkylene and members of the above group further substituted by acyloxy and hydroxyl, $x$ is a whole number having a value of 1 to about 80 or more.

Typical examples of alkyl, alkoxyalkyl, aralkyl, aryl, alkaryl, cycloalkyl, alkyl cycloalkyl, alkylene, alkenylene and acyloxy are illustrated above. With respect to the complex esters, it is preferred that $R_{27}$ and $R_{30}$ be alkyl having from about 3 to about 12 carbon atoms, more preferably from about 4 to about 10 carbon atoms and that $R_{28}$ and $R_{29}$ be alkylene or acyloxy substituted alkylene wherein the alkylene portion contains from about 2 to about 12 carbon atoms, more preferably from about 4 to about 8 carbon atoms and the acyloxy substituent contains from about 2 to about 12 carbon atoms.

Typical examples of complex esters can be obtained by esterifying dicarboxylic acids with a mixture of monohydric alcohol and a glycol to give complex esters. Complex esters which can be employed can be prepared by esterifying a dicarboxylic acid (1 mole) with a glycol (2 moles) and a monocarboxylic acid (2 moles) or with 1 mole each of a glycol, a dicarboxylic acid and a monohydric alcohol or with 2 moles each of a monohydroxy monocarboxylic acid and a monohydric alcohol. Still other complex esters may be prepared by esterifying a glycol (1 mole) with a monohydroxy monocarboxylic acid (2 moles) and a monocarboxylic acid (2 moles).

Other complex esters which are suitable as base stocks are prepared by polymerizing a dihydroxy compound with a dicarboxylic acid and reacting the terminal hydroxy and acid radical with a mixture of a monocarboxylic acid and a monohydric alcohol. Specific examples of polymers which may be utilized as additives within the scope of this invention are polymers prepared by the polymerization of adipic acid and 1,2-propane diol in the presence of minor amount of short-chain monocarboxylic acids and a monohydric alcohol to give molecular weights of the polymers thereby produced of from about 700 to about 40,000 or higher.

The mono-, di- and polyhydric alcohols, and the monocarboxylic acids employed in the preparation of the complex esters can also contain ether oxygen linkages.

Specific examples of suitable complex esters are esters prepared from methylene glycol (1 mole), adipic acid (2 moles) and 2-ethylhexanol (2 moles); esters prepared from tetraethylene glycol (1 mole), sebacic acid (2 moles), and 2-ethylhexanol (2 moles); esters prepared from 2 - ethyl - 1,3 - hexanediol (1 mole), sebacic acid (2 moles) and 2-ethylhexanol (2 moles); esters prepared from diethylene glycol (1 mole), adipic acid (2 moles) and n-butanol (2 moles); esters prepared from polyglycol 200 (1 mole), sebacic acid (2 moles) and ethylene glycol mono(2-ethylbutyl) ether (2 moles); esters prepared from sebacic acid (1 mole), tetraethylene glycol (2 moles) and caproic acid (2 moles); esters prepared from triethylene glycol (1 mole), adipic acid (1 mole), n-caproic acid (1 mole) and 2-ethylhexanol (1 mole); esters prepared from sebacic acid (1 mole), lactic acid (2 moles) and n-butanol (2 moles); esters prepared from tetraethylene glycol (1 mole), lactic acid (2 moles) and butyric acid (2 moles); complex esters prepared from neopentyl glycol (2 moles), dicarboxylic acids (1 mole) and monocarboxylic acids (2 moles) and complex esters prepared from neopentyl glycol (1 mole) dicarboxylic acids (2 moles) and monohydric neoalcohols, e.g., 2,2,4-trimethylpentanol (2 moles).

Another class of base stocks which can be utilized as base stocks for preparing compositions of this invention are those base stocks represented by the structure

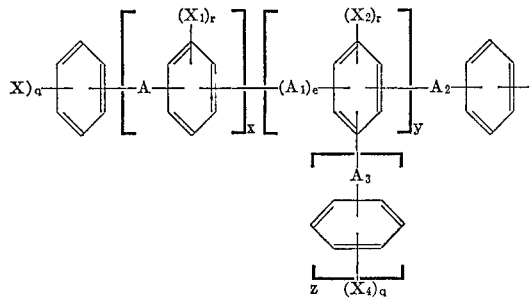

wherein $A$, $A_1$, $A_2$ and $A_3$ are each a chalkogen having an atomic number of 8 to 16; each $q$ is a whole number having a value of 1 to 5; each $r$ is a whole number having a value of 1 to 4; $X$, $X_1$, $X_2$, $X_3$ and $X_4$ each are selected from the group consisting of hydrogen, alkyl, haloalkyl, halogen, aralkyl and haloaralkyl, and the above aryl-containing radicals further substituted with alkyl, $x$, $y$ and $z$ are whole numbers each having a value of 0 to 8 and $e$ is a whole number having a value of 0 to 1 provided that when $e$ is 0, $y$ can have a value of 1 to 2. Typical examples of such base stocks are 2- to 7-ring ortho-, meta- and para-polyphenyl ethers and mixtures thereof, 2- to 7-ring ortho-, meta- and para-polyphenyl thioethers and mixtures thereof, mixed polyphenyl ether-thioether compounds in which at least one of the chalkogens represented by $A$, $A_1$, $A_2$ and $A_3$ is dissimilar with respect to any one of the other chalkogen, dihalogenated diphenyl ethers, such as 4-bromo-3'-chlorodiphenyl ethers and bisphenoxybiphenyl compounds and mixtures thereof. It is also contemplated within the scope of this invention that the phenyl and phenylene groups in the aforedescribed aromatic ether compounds can be partially or totally replaced by a heterocyclic group such as thiophene or pyridene. Such heterocyclic groups con contain from 4 to 10 atoms optionally interrupted by from 1 to 4 hetero atoms such as oxygen, nitrogen and sulfur.

Typical examples of alkyl, haloalkyl, aralkyl, haloalkyl and the aryl-containing radicals further substituted with alkyl are illustrated above. With respect to the above aryl ethers, it is preferred that the number of rings present be from about 2 to about 7 and in addition it is preferred that the aromatic ether compound contains rings selected from phenyl and phenylene. The preferred groups, represented by $X$, $X_1$, $X_2$, $X_3$ and $X_4$ are hydrogen, alkyl having from 1 to about 6 carbon atoms and aralkyl having from 6 to about 12 carbon atoms.

Examples of the polyphenyl ethers contemplated are the bis(phenoxyphenyl) ethers, e.g., bis-(m-phenoxyphenyl) ether, the bis(phenoxyphenoxy)benzenes, e.g., m-bis(m-phenoxyphenoxy)benzene, m - bis(p - phenoxyphenoxy) benzene, o - bis(o - phenoxyphenoxy)benzene, the bis-(phenoxyphenoxyphenyl) ethers, e.g., bis[m-(m-phenoxyphenoxy)phenyl] ether, bis[p - (p - phenoxyphenoxy phenyl] ether, m - [(m - phenoxyphenoxy)(o- phenoxyphenoxy)] ether and the bis(phenoxyphenoxyphenoxy) benzenes, e.g., m-bis[m-(m-phenoxyphenoxy)phenoxy] benzene, p - bis[p - (m-phenoxyphenoxy)phenoxy]benzene, m-bis[m - (p - phenoxyphenoxy)phenoxy]benzene and mixtures thereof with other polyphenyl ethers.

Typical examples of polyphenyl thioethers and mixed polyphenyl ethers and thioethers are 2-phenylmercapto-4'-phenoxydiphenyl sulfide,
2-phenoxy-3'-phenylmercaptodiphenyl sulfide,
o-bis(phenylmercapto)benzene,
phenylmercaptobiphenyl,
bis(phenylmercapto)biphenyl,
m-(m-chlorophenylmercapto)-m-phenylmercaptobenzene,
phenylmercapto)phenoxy)biphenyl,
m-chlorodiphenyl sulfide,
bis(o-phenylmercaptophenyl) sulfide,
m-bis(m-phenylmercaptophenylmercapto)benzene,
1,2,3-tris(phenylmercapto)benzene,
1-phenylmercapto-2,3-bis(phenoxy)benzene,
o-bis(o-phenylmercaptophenylmercapto)benzene,
m-bis(p-phenylmercaptophenylmercapto)benzene,
2,2'-bis(phenylmercapto)diphenyl ether,
3,4'-bis(m-tolylmercapto)diphenyl ether,
3,3'-bis(xylylmercapto)diphenyl ether,
3,4'-bis(m-isopropylphenylmercapto)diphenyl ether,
3,4'-bis(p-tert-butylphenylmercapto)diphenyl ether,
3,3'-bis(m-chlorophenylmercapto)diphenyl ether,
3,3'-bis(m-trifluoromethylphenylmercapto)diphenyl ether,
3,4'-bis(m-perfluorobutylphenylmercapto)diphenyl ether,
2-m-tolyloxy-2'-phenylmercaptodiphenyl sulfide,
o-bis(phenylmercapto)benzene,
bis(m-phenylmercaptophenyl) sulfide,
m-phenylmercaptophenyl-p-phenylmercaptophenyl sulfide, the trisphenylmercaptobenzenes such as 1,2,4-trisphenylmercaptobenzene,
3,3'-bis(phenylmercapto)diphenyl,
m-bis(p-phenylmercaptophenylmercapto)benzene,
m-bis(m-phenylmercaptophenylmercapto)benzene,
bis[m-(m-phenylmercaptophenylmercapto)phenyl] sulfide,
3,3'-bis(phenylmercapto)diphenyl ether,
3,3'-bis(phenoxy)diphenyl sulfide,
3-phenoxy-3'-phenylmercaptodiphenyl sulfide,
3-phenylmercapto-3'-phenoxydiphenyl ether,
3,4'-bis(phenylmercapto)diphenyl ether,
m-bis(m-phenylmercaptophenoxy)benzene,
3-phenylmercapto-3'-(m-phenylmercaptophenylmercapto)diphenyl ether.

Additional typical examples of such ethers and sulfides, that is, when $x$, $y$ and $z$ have a value of 0, $A_2$ is oxygen or sulfur and $X$ and $X_3$ are halogen are 2-bromo-2'-chlorodiphenyl ether, 2-bromo-2'-chlorodiphenyl sulfide, 2-bromo-3'-chlorodiphenyl ether, 2-bromo - 3' - chlorodiphenyl sulfide, 2-bromo-4'-chlorodiphenyl ether, 2 - bromo - 4'-chlorodiphenyl sulfide, 3-bromo-2'-chlorodiphenyl ether, 3-bromo-2'-chlorodiphenyl sulfide, 3-bromo-3'-chlorodiphenyl ether, 3-bromo-3'-chlorodiphenyl sulfide, 3-bromo-3'-chlorodiphenyl ether, 3-bromo-4'-chlorodiphenyl sulfide, 4-bromo-3'-chlorodiphenyl ether, 4-bromo-3'-chlorodiphenyl sulfide, 4-bromo-4'-chlorodiphenyl ether, 4-bromo-4'-chlorodiphenyl sulfide, 4-bromo - 2' - chlorodiphenyl ether, 4-bromo-2'-chlorodiphenyl sulfide, 2,2'-dibromodiphenyl ether, 2,2'-dibromodiphenyl sulfide, 2,3'-dibromodiphenyl ether, 2,3'-dibromodiphenyl sulfide, 2, 4'-dibromodiphenyl ether, 2,4'-dibromodiphenyl sulfide, 3,3'-dibromodiphenyl ether, 3,3'-dibromodiphenyl sulfide, 3,4'-dibromodiphenyl ether, 3,4'-dibromodiphenyl sulfide, 4,4'-dibromodiphenyl ether, 4,4'-dibromodiphenyl sulfide, 2,2'-dichlorodiphenyl ether, 2,2'-dichlorodiphenyl sulfide, 2,3'-dichlorodiphenyl ether, 2,3'-dichlorodiphenyl sulfide, 2,4'-dichlorodiphenyl ether, 2,4'-dichlorodiphenyl sulfide, 3,3'-dichlorodiphenyl ether, 3,3'-dichlorodiphenyl sulfide, 3,4'-dichlorodiphenyl ether, 3,4'-dichlorodiphenyl sulfide, 4,4'-dichlorodiphenyl ether and 4,4'-dichlorodiphenyl sulfide.

The halodiphenyl ethers are generally preferred over the sulfides because their lower melting points make them usable in a wider number of applications and of the ethers, those in which the halogen substituents are in the 3,4'-relationship are preferred for use in the compositions of this invention, because their low melting points are the lowest of all the ethers.

Still another class of aromatic ethers useful in compositions of this invention are certain pyridine derivatives wherein $A_2$ is selected from the group consisting of oxygen and sulfur, $x$, $y$ and $z$ have a value of 0, one of the phenyl groups is replaced with pyridyl and X and $X_3$ are each selected from the group consisting of fluorine, chlorine and bromine. The preferred pyridine compounds are those where X and $X_3$ are each selected from bromine and chlorine and the sum of each $q$ is from 1 to 3.

The pyridine derivatives can be prepared by (1) reacting an alkali metal salt of a 3-hydroxypyridine with halogenated benzene or conversely by (2) reacting an alkali metal salt of a phenol with a halogenated pyridine in which there is a halogen in the 3-position. For the compounds where A is S, that is, 3-phenylmercaptopyridines, the same general procedures are used except that in procedure (1) a 3-mercaptopyridine is substituted for the 3-hydroxypyridine, and in procedure (2) a thiophenol is substituted for a phenol. To facilitate preparation of both classes of compounds an inert solvent can be used.

Examples of pyridine derivatives useful in compositions of this invention are 3-(2'-bromophenoxy)pyridine, 3-(3'-bromophenoxy)pyridine, 3-(4'-bromophenoxy)pyridine, 3-(3'-fluorophenoxy)pyridine, 3 - (3' - chlorophenylmercapito)-5-chloropyridine and 3-(4'-chlorophenylmercapto)-5-chloropyridine.

Other typical examples of base stocks which are useful in preparing compositions of this invention are mono- and dialkylthiophenes, which term, as used herein includes cycloalkyl-containing thiophene compounds. Typical examples of thiophenes are 2,4-(1-hexyl-1-methylnonyl)-thiophene, 2,4-(1-hexyl-1-methylnonyl)thiophene, 2-tert-butylthiophene, 2,5-tert-butylthiophene, 2,5-(1,1-dimethylpropyl)thiophene, 2,5-(1-butyl-1-octylnonyl)thiophene, 2,5-(1-propylcyclobutyl)thiophene, 2-tert-butyl-4-(1 - octyl-1-methyloctadecyl)thiophene, 2,5 - (1 - methylcyclohexyl)thiophene, 2,5-(1-octyl-1 - methyldecyl)thiophene, 2,5-1,1-dimethyltridecyl)thiophene, 2,3-(1,1 - dimethyltridecyl)thiophene, 2,4 - (1,1 - dimethyltridecyl)thiophene, 2,4-(1-methylcyclopentyl)thiophene and 2,5-(1-n - dodecylpentyl)thiophene.

Typical examples of alkyl, cycloalkyl and alkyl cycloalkyl are illustrated above. It is preferred that the alkyl cycloalkyl and alkyl cycloalkyl groups contain from about 3 to about 24 carbon atoms, more preferably from about 4 to about 20 carbon atoms.

Another base stock which can be utilized in preparing the compositions of this invention are halogenated biphenyl compounds having from 20 to 61% by weight combined chlorine. Typical examples of halogenated biphenyl compounds are those which contain chlorine or bromine or combinations thereof in amounts corresponding to mono-, di-, tri-, tetra-, penta- and hexahalobiphenyl. Typical of such biphenyl compounds are the chlorinated biphenyls commercially available as products containing 32%, 42%, 48%, 54% and 60% by weight of combined chlorine. The expression halogenated biphenyl containing a stated percentage of combined halogen is used herein as including the directly halogenated products, halogenated products containing more than one specie of halogen in the same molecule and blends of one or more of such halogenated products whereby the halogen content is broadly within the range of about 30% to 60%, preferably within the range of about 30% to 42% by weight.

An additional class of base stocks which can be utilized to prepare compositions of this invention are blends of esters of an acid of phosphorus and/or amides of an acid of phosphorus and/or aromatic ether compounds and/or esters of polyhydric compounds with halogenated blending agents. It is preferred to have from about 20 to about 80% by weight of at least one member of the aforedescribed base stocks and from about 20 to about 80% by weight of a blending agent. Included within the term "blending agent" are halodiphenyl ethers, halobenzenes, haloalkylated benzenes, perhalodienes, perhalo-cyclicdienes, halonaphthalenes, halogenated terphenyls, haloquaterphenyls and halobiphenyls which halobiphenyls are illustrated above as base stocks. Typical examples of the esters of an acid of phosphorus, amides of an acid of phosphorus, aromatic ether compounds and esters of polyhydric compounds and the preferred base stocks within these classes of base stocks are illustrated above. The preferred base stocks illustrated above are in addition preferred in preparing this present base stock which includes a halogenated blending agent. Typical examples of monohalodiphenyl ethers and halogenated naphthalenes are 3-chlorodiphenyl ether, 3-bromo-diphenyl ether, 2-chloronaphthalenes, 3-chloronaphthalenes, 3,5-dichloronaphthalenes, 3,6-dichloronaphthalene, 3,5,8-trichloronaphthalenes and 3,5,8-tribromonaphthalenes.

Additional examples of halogenate dblending agents are the halogenated lower alkyl ($C_{2-4}$) benzenes containing 1 to 5 halogens, such as 4-bromomethylbenzene, 2-bromoethylbenzene, 4-bromopropylbenzene, 4-chlorobutylbenzene, 2,4-dichloromethylbenzene, 2,3-dibromoethylbenzene, 2,4-dibromoethylbenzene, 2,4-dichloroethylbenzene, 2-bromo-4-chloroethylbenzene, 2,5-dibromoethylbenzene, 3,4-dibromoethylbenzene, 3,5-dibromopropylbenzene, 2,4-dichlorobutylbenzene and the like. Further examples of halogenated alkyl benzenes are tri- and tetrachloroethylbenzene, tri- and tetrabromoethylbenzene, pentachloromethylbenzene, pentachloroethylbenzene, pentabromoethylbenzene, pentabromopropylbenzene, pentachlorobutylbenzene and the like.

In addition to the use of specific compounds, there can be used a mixture of halogenated alkylbenzenes such as the mixture of halogenated ethylbenzenes disclosed in U.S. Pat. No. 2,257,903, which contain an average of two atoms of bromine per mole of ethylbenzene. The mixture of Example 1 of U.S. Pat 2,257,903 is particularly preferred for use in the fluids of this invention because of its low crystallizing point.

Typical examples of halobenzenes useful as blending agents are o-dibromobenzene, 1-bromo-3-chlorobenzene, 1,3 - dichloro - 5-bromobenzene, 1,3-difluoro-5-bromobenzene, 1,3-difluoro-5-bromobenzene, 1-fluoro-3-chloro-5-bromobenzene, 1,2,3,4-tetrachloro-5-bromobenzene, 1,2,3,4 - tetrafluoro - 5-bromobenzene, 1,3-dibromo-5-chlorobenzene, 1,3-dibromo-4,6-difluorobenzene, hexafluorobenzene, hexachlorobenzene and preferably m-dibromobenzene.

Typical examples of perhalodienes and perhalocyclodienes useful as blending agents are those compounds having at least to about 8 carbon atoms in the molecule. Typical perhalodienes are perchlorobutadiene, perbromobutadiene, perfluorobutadiene, perchloropentadiene, perfluoropentadiene, perbromopentadiene, perchlorooctadiene, perbromooctadiene and perfluorooctadiene. Perchlorobutadiene is preferred. Typical perhalocyclodienes are perchlorocyclobutadiene, perfluorocyclobutadiene, perchlorocyclopentadiene, perbromocyclopentadiene, perfluorocyclopentadiene, perchlorocyclohexadiene, perbromocyclohexadiene, perchlorocycloheptadiene, perchlorocylooctadiene and perfluorocyclooctadiene.

It is also contemplated within the scope of this invention that mixtures of individual compounds which are included in a generic type of base stock can be utilized as a single base stock. For example, two different polyesters can be blended together to form a single base stock. In addition, it is contemplated within the scope of this invention that the various generic types of base stocks can be blended together to form a base stock. Thus, a mixture of 5-ring polyphenyl ethers can be blended with a polycarboxylic acid ester to form a base stock.

The invention can be better appreciated by the following non-limiting examples. In Examples 1 and 2, as given in Table I, damage tests were run using mild steel specimens in about 750 to about 1000 cc. of fluid at a fluid temperature of about 137° F. The metal specimen was vibrated in the fluid at 15 kilocycles with an 0.0002 inch amplitude for a period of 4 hours. In Examples 3 through 23 a nickel specimen was immersed in the fluid and a 20 kilocycle vibration induced adjacent to the specimen. The temperature of the fluid was 85° C. and the test duration was 45 minutes.

In Example 2, a mineral oil, herein designated Fluid A, was utilized as the test fluid and had the following specification.

Property: Value
Viscosity in centistokes at 54.4° C.
  (130° F.) (min.) _____ 10.0
Viscosity in centistokes at −40° C.
  (−40° F.) (max.) _____ 500
Viscosity in centistokes at −54° C.
  (−65° F.) (max.) _____ 3000
Pour point (max.) _____ −59.4° C. (−75.0° F.)
Flash point (min.) _____ 93.3° C. (200.0° F.)
Acid or base No. (max.) _____ 0.20

Each base stock is listed as one separate example, whereas the runs indicate separate runs of that fluid at the various concentrations of water that are so indicated in Table I. Relative weight loss is defined to mean the total weight loss of the metal specimen when tested in a fluid containing the additive present divided by the weight loss of the metal specimen when the neat fluid is tested without any additive present, times 100. The volume of water that was added had a specific gravity of 1 at 24° C. The volume percent of water added was determined by dividing the volume of water added by the total volume of the final fluid composition times 100. The weight percent of water in the fluid composition is obtained by dividing the volume of water added by the product obtained by multiplying a volume of the final fluid composition times the density of the final fluid composition, times 100. In general, it has been found that the weight percent of water in the fluid composition at these low concentrations does not vary significantly from the volume percent of water in the fluid composition.

TABLE I

| Ex. No. | Fluid composition | Run | Volume percent water in fluid | Relative weight loss |
|---|---|---|---|---|
| 1 | 87.5% dibutylphenyl phosphate, 11% Acryloid VI improver, 1% epoxidized soybean oil, .50% bis (1,2-phenylmercapto) ethane. | 1<br>2<br>3<br>4 | 0.50<br>0.75<br>1.25<br>2.25 | 71<br>40<br>17<br>10 |
| 2 | Fluid A | 1 | 0.50 | 70.5 |
| 3 | 4.2% Acryloid VI improver, 47.8% 2-ethylhexyldiphenyl phosphate, 47.8% isooctyldiphenyl phosphate, 10 p.p.m. silicone. | 1<br>2<br>3 | 0.39<br>0.64<br>1.14 | 47<br>29<br>23 |
| 4 | Dibutylphenyl phosphate | 1<br>2<br>3 | 0.71<br>1.21<br>2.21 | 80<br>62<br>36 |
| 5 | Tributyl phosphate | 1<br>2<br>3<br>4 | 0.69<br>1.19<br>2.19<br>5.19 | 84<br>49<br>32<br>4 |
| 6 | Tricresyl phosphate | 1 | 0.5 | 47 |
| 7 | 2:1 tributyl phosphate-tricresyl phosphate. | 1 | 1.0 | 71 |
| 8 | 1:1 tributyl phosphate-tricresyl phosphate. | 1 | 1.0 | 81 |
| 9 | Tri(2-butoxyethyl) phosphate | 1 | 1.0 | 50 |
| 10 | Dioctyl sebacate | 1 | 0.29 | 59 |
| 11 | Pentaerythritol tetravalerate | 1 | 0.45 | 44 |
| 12 | 70% tributyl phosphate, 22.5% tricresyl phosphate, 7.5% 2-ethylhexyl sebacate. | 1 | 1.0 | 68 |
| 13 | 68% tributyl phosphate, 20% tricresyl phosphate, 7.5% 2-ethylhexyl sebacate, 4.5% Acryloid VI improver. | 1 | 1.06 | 40 |
| 14 | 2-ethylhexyldiphenyl phosphate | 1 | 1.05 | 18 |
| 15 | Isooctyldiphenyl phosphate | 1 | 1.04 | 16 |
| 16 | Chlorinated biphenyl having an approximate chlorine content of 32% by weight. | 1 | 0.25 | 61 |
| 17 | Tetra-2-ethylhexyl silicate | 1 | 0.27 | 68 |
| 18 | 5-ring polyphenyl ether blend, 65% m-bis(m-phenoxyphenoxy)benzene, 33% m-(m-phenoxyphenoxy)phenyl-p-phenoxyphenyl ether. | 1 | 0.30 | 68 |
| 19 | 49.9% m-bisthiophenoxybenzene, 49.9% a mixture of 4-ring thioethers and mixed thiooxyethers. | 1 | 0.28 | 16 |
| 20 | N-methyl-N-butyl-N'-methyl-N'-butyl-p-phosphorodiamidate. | 1 | 1.02 | 54 |
| 21 | 75% 3-chloro-4'-bromodiphenyl ether, 25% 3-chlorodiphenyl ether. | 1 | 0.55 | 61 |

The test method as employed to determine realtive damage has been found to correlate quite well to actual test runs on simulated hydraulic system test stands, such as the Fairey Test Stand, and has correlated quite well with the hydraulic system of commercial aircraft where damage levels have been determined. Functional fluid compositions of this invention with additive water sufficient to inhibit and control damage have been evaluated in actual hydraulic systems in test stands and commercial aircraft and have been found to effectively inhibit damage and are far superior to the neat fluids without additive amounts of water. More particularly, a phosphate ester hydraulic fluid, dibutylphenyl phosphate, having incorporated therein 0.45 weight percent water has been evaluated in an aircraft hydraulic system of a Trident 1 aircraft and compared to the same system which utilized the same type phosphate ester base stock, dibutylphenyl phosphate, as a hydraulic fluid without additive water. The reduction in damage was determined by comparing the removal rate of a Vickers Sperry Rand engine driven pump over a period of seven months after the introduction of the above phosphate ester having incorporated therein 0.45 weight percent water with the prior removal rate of the non-additive water phosphate hydraulic fluid. The removal rate of pumps per 1000 hours of flight time was on an average reduced by 1000% based upon the removal rates of pumps using a phosphate hydraulic fluid not having incorporated therein additive water. The tremendous reduction in pump removal rates clearly demonstrates the outstanding effectiveness of compositions of this invention for controlling damage in aircraft hydraulic systems.

In addition to determining pump removal rates, the water content in the phosphate base stock was monitored. The variation in water content in three hydraulic systems of a Trident 1 aircraft after 780 hours of flight time showed water variations of less than 0.02, 0.02 and 0.03 weight percent, respectively. From the above data it is clear that there is no significant variation in water content utilizing functional fluid compositions of this invention.

It is believed that the cause of cavitation damage in aircraft hydraulic systems is by a pressure excursion process whereby the fluid pressure dips below fluid bubble point pressure. In the case where the fluid pressure dips below the fluid bubble point pressure, damage on the return side of the cycle, that is, the side where a high pressure is again encountered, is observed. The pressure excursion process for aircraft hydraulic systems appears to be initiated by simple acceleration of flow through a restricted passage from high to low pressure. Damage has been observed in the valve porting areas on servo valves electrical depressurizing valves in pumps, pressure regulating valves, poppet relief valves, solenoid valves, check vales (ball or poppet) and in general wherever a large pressure drop exists across a short seating region, that is, for example, the seating region where a valve seats in the pump. The cavitation damaged area that is seen in valve posting areas on microscopic analysis has the following appearance: jagged, cinder-like, irregular, rough, undermined, peak-valley and cavities. The damage observed by microscopic analysis does not exhibit coloration or pitting such as would be found by corrosion, gouges, scratches such as would be exhibited by machining, fatigue spalling such as would be observed by the sudden removal by large particles, particle erosion which would be exhibited by smooth and rounded edges or by wear wherein microscoring and metal transfer is observed. Thus, damage in a hydraulic system and in particular aircraft hydraulic systems which is subject to cavitation damage can be determined by comparing under microscopic examination damaged areas of valves with similar valves which are subject to the phenomenon of wear, fatigue spalling, corrosion, machining and particle erosion. In addition, valves undergoing damage by the process of cavitation can be compared with known specimens which have been subjected to induced cavitation damage. An example of this type of a comparison is a comparison of damaged metal tips in the vibrating probe with damaged valves from a hydraulic system. A comparison of this type can demonstrate damage in a hydraulic system since the vibrating probe gives a characteristic damage spectrom which is exhibited by valves in a hydraulic system.

In addition to comparison with the vibrating probe, cavitation damage can be generated using a cavitating orifice test apparatus. This apparatus simulates actual aircraft hydraulic systems by passing a fluid through a restriction, which subjects the fluid to the requisite changes thereby generating cavitation damage on a metal specimen. The orifice test is illustrated in application Ser. No. 612,622. Thus, the damage that is generated on a metal specimen utilizing the orifice test apparatus can be compared to actual valves from aircraft hydraulic systems and the determination made as to whether or not that particular hydraulic system is subject to cavitation damage.

In addition, apparatus have been invented which determine the leakage rate through valves in hydraulic systems and in particular aircraft hydraulic systems. These apparatus are referred to as leak detectors and can determine leakage rates in aircraft hydraulic systems. In addition, leakage rates can be continually monitored over a period of time. Thus, aircraft hydraulic systems which are subject to cavitation damage will exhibit increased leakage rates over a period of time as the geometry of the valve is altered through cavitation damage. It has been found that aircraft hydraulic systems operating utilizing functional fluid compositions of this invention when compared to aircraft hydraulic systems not using functional fluid compositions of this invention exhibit reduced leakage rates as a function of time based upon the above comparison. A type of leak detector for monitoring leakage rates is disclosed in application Ser. No. 630,667.

Utilizing the above methods a determination of whether or not an aircraft hydraulic system is subject to cavitation damage can be made. Any one or a combination of the test methods illustrated above can be utilized. The reduction in cavitation damage utilizing functional fluid compositions of this invention, in addition, can be determined utilizing the above test methods. Thus, it has been found that cavitation damage in an aircraft hydraulic system can be determined and in addition the reduction in cavitation damage utilizing functional fluid compositions of this invention can be determined. It has been found that a tremendous reduction in cavitation damage is observed when functional fluid compositions of this invention are compared to functional fluid compositions not having incorporated therein additive amounts of water when used in hydraulic systems subject to cavitation damage. Therefore as a result of the excellent control of damage utilizing the compositions of this invention, hydraulic systems and in particular aircraft hydraulic systems can have cavitation damage inhibited and controlled continually from the time of introduction of the functional fluid compositions of this invention into a hydraulic system. Thus, included within this invention is a process for continually controlling cavitation damage in a hydraulic system which is subject to cavitation damage when operated using a hydraulic fluid comprising a major amount of a base stock selected from those described above having incorporated therein a damage inhibiting amount of additive water.

As a result of the excellent inhibition and control of damage utilizing the functional fluid compositions within the scope of this invention, improved hydraulic pressure devices can be prepared in accordance with this invention which comprise in combination a fluid chamber and an actuating fluid composition in said chamber, said fluid comprising a major amount if one or more of the base stocks hereinbefore described and a damage inhibiting amount of water. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable volume type of system.

The pumps may be of various types, including centrifugal pumps, jet pumps, turbine vane, liquid piston gas compressors, piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves, relief valves, servo valves, non-return valves, poppet valves or unloading valves. Fluid motors are usually constant- or variable-discharge piston pumps caused to rotate by the pressure of the hydraulic fluid if the system with the power supplied by the pump power source. Such a hydraulic motor may be used in connection with a variable-discharge pump to form a variable-speed transmission. It is, therefore, especially important that the frictional parts of the fluid system which are lubricated by the functional fluid be protected from damage. Thus, damage brings about seizure of frictional parts, excessive wear and premature replacement of parts.

The fluid compositions of this invention when utilized as a functional fluid can also contain dyes, pour point depressants, metal deactivator, acid scavengers, antioxidants, defoamers in concentration sufficient to impart antifoam properties, such as from about 10 to about 100 parts per million, viscosity index improvers such as polyalkylacrylates, polyalkylmethacrylates, polycyclic polymers, polyurethanes, polyalkylene oxides and polyesters, lubricity agents and the like.

It is also contemplated within the scope of this invention that the base stocks as aforedescribed can be utilized singly or as a fluid composition containing two or more base stocks in varying proportions. The base stocks can also contain other fluids which include in addition to the functional fluids described above fluids derived from coal products, and synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, alkyl benzenes, (e.g., monoalkylbenzene such as dodecyl benzene tetradecylbenzene, etc.), and dialkylbenzenes (e.g., n-nonyl-2-ethyl hexylbenzene); polyphenyls (e.g., biphenyls and terphenyls), hydrocarbon oils including mineral oils derived from petroleum sources and synthetic hydrocarbon oils, examples of which are mineral oils having a wide range of viscosities and volatilities such as naphthenic base, paraffinic base and mixed base mineral oils; synthetic hydrocarbon oils such as those derived from oligomerization of olefins such as polybutenes and oils derived from high-alpha-olefins of from 8 to 20 carbon atoms by acid catalyzed dimerization and by oligomerization using trialuminum alkyls as catalysts; halogenated benzene, halogenated lower alkylbenzene and monohalogenated diphenyl ethers.

While this invention has been described with respect to various specific examples and embodiments, it is to be understood that the invention is not limited thereto and that it can be variously practiced within the scope of the following claims.

What is claimed is:

1. A method for controlling damage to mechanical members in a hydraulic system which comprises employing as the hydraulic fluid in said system a composition comprising
   (A) at least 60% by weight of a phosphorus ester base stock selected from the group consisting of
      (1) (a) a phosphorus-containing base stock represented by the formula

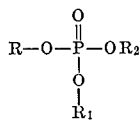

$R_1$ and $R_2$ are each selected from the group consisting of alkyl and alkoxyalkyl having from 1 to 18 carbon atoms, aryl, aralkyl, aroxyaryl, alkoxyaryl, alkaralkyl and alkaryl having from 6 to 16 carbon atoms and R is selected from the group consisting of aryl, aralkyl, aroxyaryl, alkoxyaryl, alkaralkyl and alkaryl having from 6 to 16 carbon atoms and
      (b) mixtures thereof,
      (c) a mixture of a base stock selected from (1)(a) and (1)(b) and a trialkyl phosphate wherein the alkyl groups each have from 2 to 12 carbon atoms provided that such trialkyl phosphate is present in the composition at a concentration of not more than 85% by weight;
      (d) a trialkyl phosphate wherein the alkyl groups each have from 2 to 12 carbon atoms
   (B) a minor amount sufficient to improve the viscosity index of the phosphorus ester base stock of a viscosity index improver selected from the group consisting of a polyalkylacrylate and a polyalkylmethacrylate, and
   (C) a damage inhibiting amount of water within the range of from 0.30 to about 2 weight percent.

2. A method for controlling damage to mechanical members in a hydraulic system which comprises employing as the hydraulic fluid in said system a composition comprising
   (A) at least 60% by weight of a base stock selected from the group consisting of phosphorus-containing compounds represented by the formula

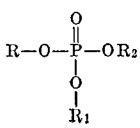

wherein $R_1$ and $R_2$ are each selected from the group consisting of alkyl and alkoxy alkyl having from 1 to 18 carbon atoms, aryl, aralkyl, aroxyaryl, alkoxyaryl, alkaralkyl, and alkaryl having from 6 to 16 carbon atoms and R is selected from the group consisting of aryl, aralkyl, aroxyaryl, alkoxyaryl, alkaralkyl and alkaryl having from 6 to 16 carbon atoms and mixtures thereof,
   (B) a minor amount sufficient to improve the viscosity index of the phosphorus-containing base stock of a viscosity index improved selected from the group consisting of a polyalkylacrylate and a polyalkylmethacrylate and
   (C) a damage inhibiting amount of water within the range of from 0.30 to about 2% by weight.

3. A method as in claim 1 wherein the phosphorus-containing base stock is a mixture of a trialkylphosphate wherein the alkyl groups each have from 2 to 12 carbon atoms and a phosphorus ester represented by the formula

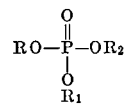

wherein R is selected from the group consisting of aryl, aralkyl, aroxyaryl, alkoxy aryl, alkaralkyl and alkaryl having from 6 to 16 carbon atoms and $R_1$ and $R_2$ are each selected from the group consisting of alkyl and alkoxy alkyl having from 1 to 18 carbon atoms, aryl, aralkyl, aroxyaryl, alkoxy aryl, alkaralkyl and alkaryl having from 6 to 16 carbon atoms provided that said trialkyl phosphate is present in the composition at a concentration of not more than 85% by weight.

4. A method as in claim 1 wherein the phosphorus ester is a trialkyl phosphate wherein the alkyl groups each have from 2 to 12 carbon atoms, and the viscosity index improver is a polyalkylmethacrylate.

5. A method as in claim 2 wherein R is phenyl and $R_1$ and $R_2$ are alkyl groups containing from 2 to 8 carbon atoms.

6. A method as in claim 5 wherein $R_1$ and $R_2$ are n-butyl and the water is present in a concentration of from 0.4 to 1.5 weight percent.

References Cited

UNITED STATES PATENTS

| 2,470,792 | 5/1949 | Schlesinger et al. | 252—78 |
| 2,934,501 | 4/1960 | Moreton | 252—78 |
| 3,218,265 | 11/1965 | Rink et al. | 252—75 X |
| 3,324,036 | 6/1967 | Shiffler | 252—78 X |

OTHER REFERENCES

Technical Bulletin, Skydrol and Skydrol 500, Monsanto Co. (1964), pp. 3, 5.

Preiser et al.: "The Electrochemical Approach to Cavitation Damage and Its Prevention," Corrosion, vol. 17, No. 11 (1958), pp. 535t–41t.

Blake et al.: "Fire-Resistant Hydraulic Fluid for Submarines," Monsanto Research Corporation (1964), pp. 10–15, and 19–22.

LEON D. ROSDOL, Primary Examiner

P. E. WILLIS, Assistant Examiner

U.S. Cl. X.R.

252—77